United States Patent [19]

Hunter, Jr.

[11] 4,386,377

[45] May 31, 1983

[54] TV INTERFACE RF MODULATION CIRCUITRY

[75] Inventor: Richard E. Hunter, Jr., Indianapolis, Ind.

[73] Assignee: RCA Corporation, New York, N.Y.

[21] Appl. No.: 253,012

[22] Filed: Apr. 10, 1981

[51] Int. Cl.³ ............... H04N 5/76; H04N 5/40; H04N 5/21

[52] U.S. Cl. .................. 358/335; 358/186; 358/188; 358/342; 360/33.1

[58] Field of Search ............... 358/335, 342, 1, 22, 358/186, 188, 191.1-193.1, 196, 181; 360/29-30, 33.1; 455/120, 280, 286

[56] References Cited

U.S. PATENT DOCUMENTS

| | | | |
|---|---|---|---|
| 3,775,554 | 11/1973 | Hjortzberg | 358/1 |
| 3,775,555 | 11/1973 | Carlson | 358/186 |
| 4,213,152 | 7/1980 | Kakinuma | 358/335 |
| 4,215,372 | 7/1980 | Suzuki | 358/188 |

OTHER PUBLICATIONS

Video Cassette Recorder Tech Manual (RCA) Models VCT 201 and VCT 400, pp. 13-14 (RF converter).
National Semiconductor Linear Databook (1978), "LM1889 TV Video Modulator," pp. 10-155 to 10-159.

Primary Examiner—Raymond F. Cardillo, Jr.
Attorney, Agent, or Firm—E. M. Whitacre; J. S. Tripoli; E. P. Herrmann

[57] ABSTRACT

An interface circuit for selectively generating TV RF signals on one of two adjacent TV channels is designed with two independent RF oscillator-modulator circuits. The respective double sideband modulated signals generated by the RF modulators are respectively passed through separate frequency rejection filters designed to attenuate the lower sound sideband of each of the modulated signals. The resultant signals are applied to a common bandpass filter via an isolation network. The pass band of the bandpass filter encompasses substantially the combination of the pass bands of the broadcast TV channels corresponding to the RF signals generated. Consequently the lower frequency RF modulated signal is similar to a conventional vestigal sideband TV signal and the higher frequency RF modulated signal is a double sideband signal minus the lower sound sideband. The isolation network provides electrical connection between the rejection filters and the bandpass filter but establishes a relatively constant impedance at the respective filter output and input terminals irrespective of changes in the filter impedances so that the filters may be tuned to the desired resonances without interaction between respective filter circuits.

6 Claims, 7 Drawing Figures

Fig. 1
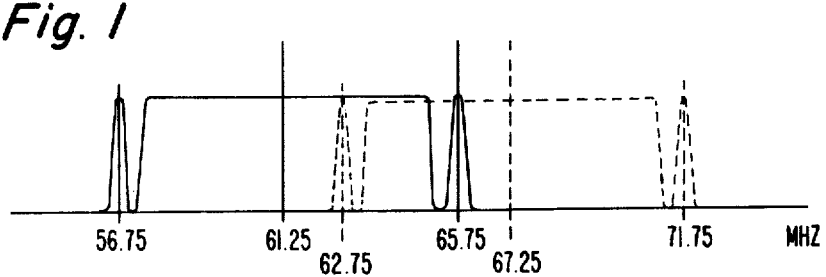
Fig. 2
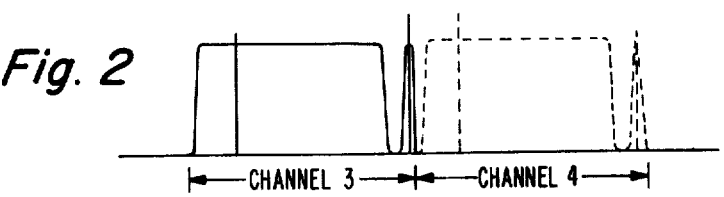
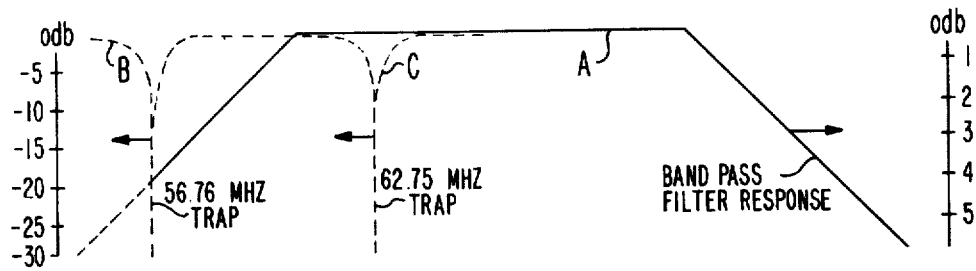
Fig. 3
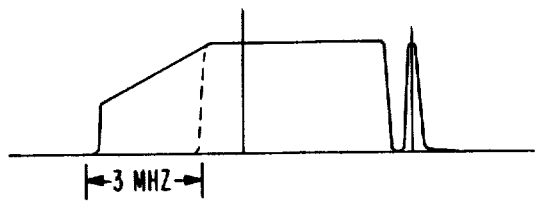
Fig. 4
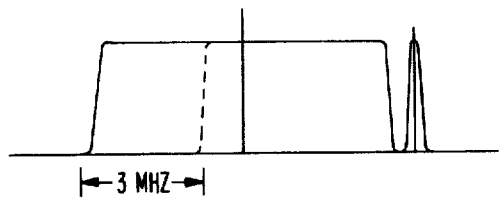
Fig. 5

TV INTERFACE RF MODULATION CIRCUITRY

BACKGROUND OF THE INVENTION

This invention relates to television, R.F. circuitry and in particular to R.F. signal generating circuitry at the output stage of a television signal source such as a video disc player, a video cassette recorder or a television game.

Video disc players, T.V. games and other ancillary T.V. signal generating apparatus produce, at their output terminals, signals which are compatible with conventional broadcast television signals so that they may be applied to the antenna terminals of a conventional television receiver. Typically a transfer switch is provided for alternately connecting either the T.V. antenna leads or the output connection of the ancillary T.V. signal source, e.g., TV game, directly to the antenna input terminals of the receiver so that the ancillary signal may be produced on one of the vhf television channels without interference from the broadcast signal assigned to that particular channel. However, if the receiver is located in a geographic area where the broadcast signal allocated to the channel utilized by the ancillary signal source is particularly strong, and the receiver has input circuitry which is highly sensitive, the broadcast signal may interfere with the ancillary signal despite the alternate connection.

In order to overcome such interference these ancillary TV signal generating devices typically have the provision for generating their output signals on two adjacent TV channels. Broadcast TV channels are normally allocated so that for a given geographic area, strong signals will not be present in both of adjacent channels. Thus the user of the ancillary TV signal source will have the option of switching to the one of the adjacent channels least affected by interference.

Broadcast TV signals are transmitted using frequency division multiplexing. Each TV channel is allotted a particular frequency spectrum and the signal bandwidth within the allotted spectrum is prescribed by regulation, e.g., in the United States by Federal Communication Commission regulations. Similarly, other regulations have been promulgated defining the requirements for signals available at the RF output terminals of the ancillary TV signal generating apparatus (see, for example, Code of Federal Regulations, Title 47, Section 15.409). But regardless of differences in regulations between broadcast and ancillary signals, the signals must be compatible for material reproduction on a conventional broadcast receiver.

A base band television signal includes a composite of luminance, chrominance and synchronizing signals with a bandwidth extending from 0–4.25 MHz (NTSC) and an FM sound carrier located at 4.5 MHz. These signals are used to amplitude modulate an RF carrier to produce the broadcast TV signal. The RF signal before transmission is a double sideband signal. Since substantially only one sideband is necessary to reconstruct the signal, part of the lower sideband is eliminated by filtering to produce a vestigal sideband broadcast signal, i.e., in the NTSC system the lower sideband is cut off at 1.25 MHz below the carrier frequency. Elimination of a portion of the lower sideband including the lower sound carrier reduces the necessary per channel bandwidth permitting the allocation of a greater number of channels in a given portion of the frequency spectrum. FCC regulations require that broadcast signals be vestigal sideband, however, the RF output signal from ancillary sources is not limited to quite so narrow channel bandwidths.

Heretofore ancillary TV signal source generating apparatus providing RF signal on two selectable output channels had provision for tuning the frequency of a single carrier oscillator between one of two adjacent frequencies and simultaneously tuning the passband of a series output filter defining the bandwidth of the RF output signal or at least the passband of the sound components of the modulated carrier, see for example U.S. Pat. No. 3,775,555, Carlson. A second technique utilized is to employ two independent oscillator-modulator systems each with a separate vestigal sideband filter tuned to but one channel. (See National Semiconductor 1978 Linear Databook, "LM1889 TV Video Modulator". pp. 10–156.) The latter method is capable of producing a more accurately tuned system but is also the more expensive to assemble. The system has been found difficult to realize in a compact arrangement because attempts to tune one of the channel vestigal sideband filters invariably detunes the other channel filter due to RF coupling of the closely situated circuit elements. The former method incorporating common circuit elements for both channels is less expensive and conceptually more compact (desirable for a volume limited package), but because of the variable tuning, is susceptible to frequency error both in the oscillator and the filter. This arrangement also requires connections between the channel selection switch and the filter which may produce sources of undesirable RF radiation.

SUMMARY OF THE INVENTION

The present invention includes two selectable independent RF oscillator-modulator circuits for generating separate modulated RF carrier signals conforming to adjacent TV channels. The modulated carrier signal from a first oscillator-modulator circuit is passed through a band rejection circuit to trap out the RF signal corresponding to the audio or sound signal in the lower side band for that particular channel. The modulated carrier signal from the second oscillator-modulator circuit is similarly applied to a second band rejection circuit to trap the RF signal corresponding to the lower sideband sound signal in its respective channel. The signals, after being filtered by the band rejection circuits, are applied to a common band pass filter via an isolation coupling circuit. The pass band of the band-pass filter is substantially equivalent to the combined pass bands of the two adjacent broadcast TV channels.

The resulting RF signals tend to be substantially double side band signals with the sound signal components removed from the lower side band. However, by judicious choice of the band pass filter characteristics, the RF signal from at least the lower of the adjacent channels can be made to conform to the standard broadcast vestigal sideband signal format.

BRIEF DESCRIPTION OF THE DRAWINGS

FIG. 1 is a graph of the relative frequency spectrum of adjacent double side band modulated TV carrier signals;

FIG. 2 is a graph of the relative frequency spectrum of adjacent broadcast TV RF signals;

FIG. 3 is a plot of the transfer function of various filter circuits illustrated in FIG. 7;

FIGS. 4 and 5 are graphic plots of the frequency spectrum of the channel output signals available from the FIG. 7 circuitry;

DETAILED DESCRIPTION OF THE INVENTION

Figure 6:
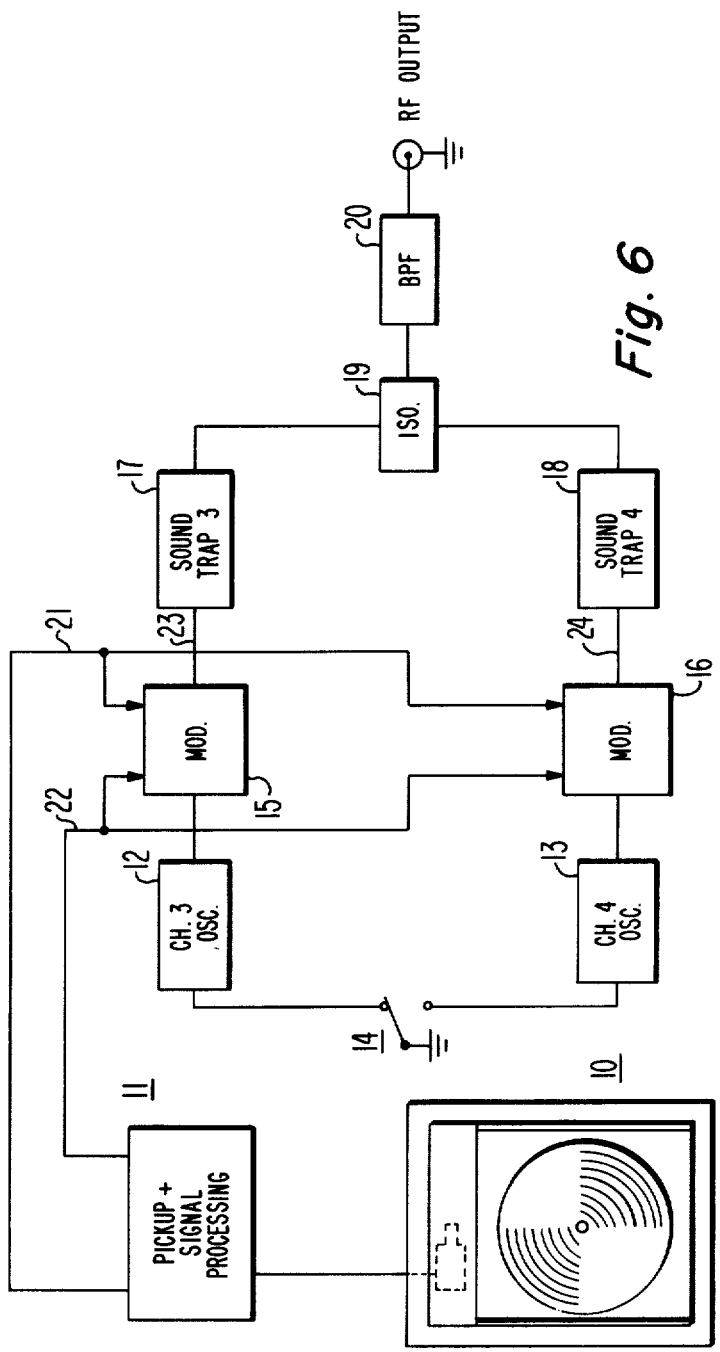
FIG. 6 is a block diagram of circuitry for selectably generating a modulated RF signal on one of two adjacent TV channels.

For convenience of discussion, the invention will be described in the environment of a video disc player apparatus designed to develop NTSC television signals. It should be appreciated at the outset that the invention is applicable to other physical environments, e.g., TV game devices and to other TV signal standards, for example, PAL or SECAM.

Referring to the drawings, FIG. 1 illustrates the frequency spectrum of adjacent double sideband amplitude modulated TV carrier signals, i.e., the channel 3 and channel 4 carriers. The channel 3 carrier is located at 61.25 MHz in the spectrum and contains a continuum of sidebands extending approximately for 4.25 MHz on either side thereof. This continuum corresponds to the composite video components of the base band television signal. The sound components of the baseband signal are located at 4.5 MHz on either side of the 61.25 MHz carrier. The sound component in the RF spectrum is 50 KHz wide and corresponds to a frequency modulated baseband audio signal having a maximum frequency deviation of 25 KHz. The channel 4 carrier is located at 67.25 MHz and the channel 4 frequency spectrum is symmetrical thereabout and is similar to the channel 3 spectrum. The channel 4 spectrum is shown in dashed lines in FIG. 1.

The lower sideband of channel 4, i.e., the broken line region shown to the left of 67.25 MHz occupies a portion of the spectrum in which the upper sideband of channel 3 is located. A similar situation exists with regard to channel 3 and channel 2, etc. (not shown). Therefore, to preclude inteference between channel signals, the double sideband signal is limited or reduced to a vestigal sideband signal before the signal is broadcast.

FIG. 2 shows the frequency spectrum of the channel 3 and channel 4 vestigal sideband signals that conform to TV broadcast signals. To produce the vestigal sideband signal the double sideband modulated signal is simply band limited at 1.25 MHz below the carrier frequency leaving a small portion of the lower sideband and the entire upper sideband, including the sound component intact. The resultant channel bandwidth is 6 MHz.

Conventional TV receivers are designed to reconstruct transmitted information from vestigal sideband signals. In general, however, it should be appreciated by those skilled in the television circuit arts that conventional receivers will also reconstruct the double sideband signal. Consider a video disc player which can selectably generate one of the two double sideband RF signals represented by the frequency spectrums illustrated in FIG. 1. If either one of these signals is applied to a bandpass filter having a frequency passband which encompasses the spectrum of both of the two vestigal sideband signals of the corresponding two channels of broadcast signals as illustrated by FIG. 2, the resulting signal, in the case of the 61.25 MHz carrier signal, will be a vestigal sideband channel 3 signal, and, in the case of the 67.25 MHz carrier signal, will be a double sideband channel 4 signal. However, the lower sideband sound component of the latter signal will typically have an undesirably large amplitude. Therefore, it is desirable to prefilter the channel 4 signal to eliminate the lower sound sideband. In addition, if the bandpass filter is to be of relatively simple construction yet have the requisite phase and ripple characteristics it is difficult to obtain relatively sharp band cutoff, i.e., the skirts of the bandpass filter transfer function will extend over a broad frequency range. As a consequence it will also be desirable to prefilter the channel 3 signal to eliminate its lower sound sideband.

Figure 7:
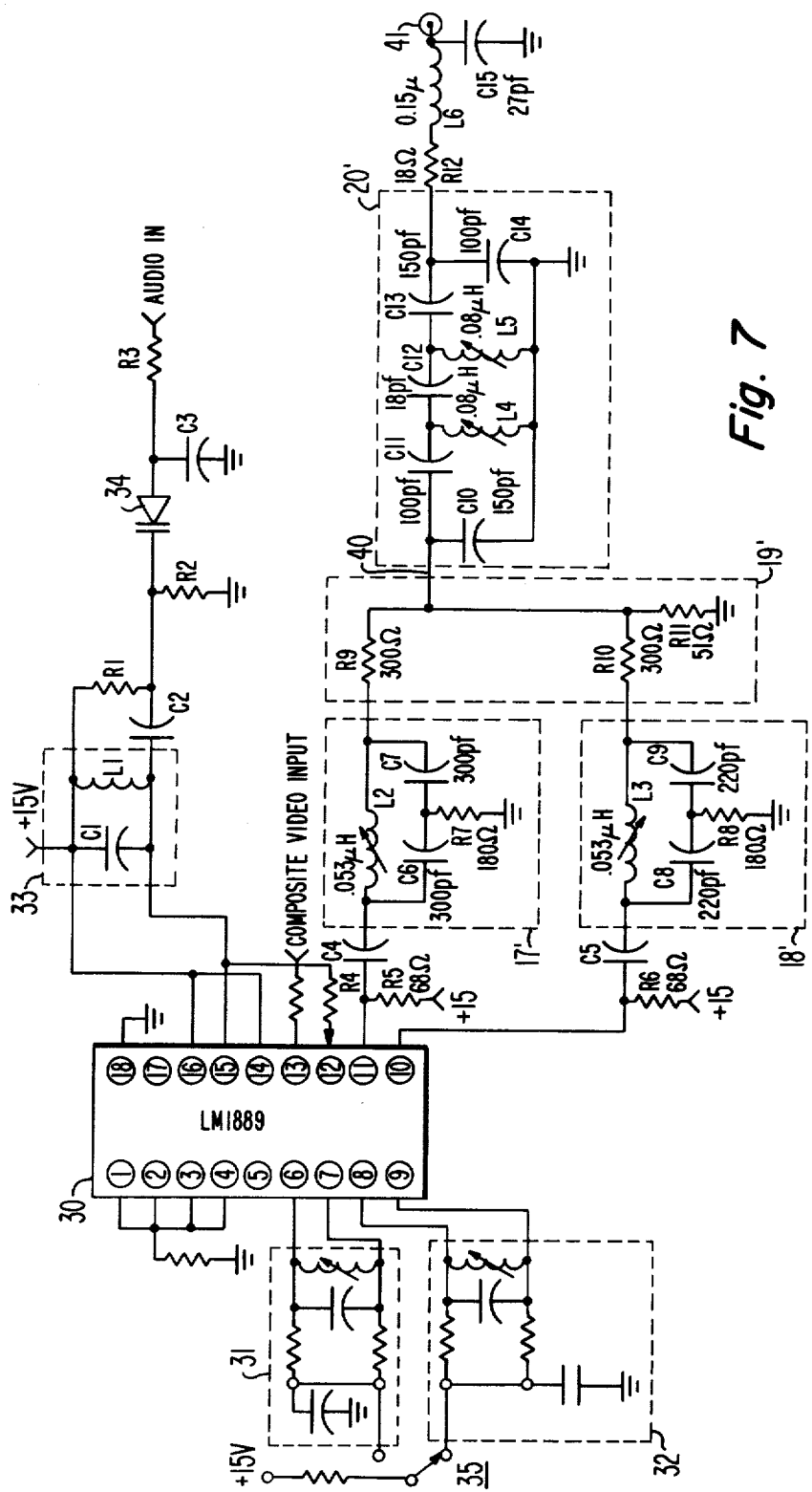
FIG. 7 is a partial block diagram, partial circuit schematic of an RF output circuit embodying the present invention.

FIG. 3 illustrates the transfer functions of three filters appropriate for achieving the foregoing results (corresponding to the response characteristics of filters 20', 18' and 17' in FIG. 7). The bandpass filter response (curve A) has a frequency pass band extending from about 60.5 MHz to 71 MHz and is down 3 db at approximately 58.5 MHz and 74 MHz. The frequency response curve of a channel 3 sound trap (band rejection filter) tuned to 56.75 MHz is illustrated by curve B. This sound trap is designed to attenuate the 56.75 MHz signal at least 30 db. Similarly a channel 4 trap (curve C) attenuates the 62.75 MHz sound side band by at least 30 db.

The result of processing a 61.25 MHz double sideband signal of the type illustrated in FIG. 1 through the 56.76 MHz trap and the bandpass filter characterized in FIG. 3 is to produce the signal having the spectral response illustrated in FIG. 4. It is seen that the lower sound sideband has been eliminated (ideally) and that a portion of the lower video sidebands have been attenuated. The broken line in FIG. 4 indicates the conventional vestigal sideband limit. Similarly, processing a 67.25 MHz double sideband signal through the 62.75 MHz trap and the bandpass filter characterized in FIG. 3 produces a channel 4 signal characterized by the frequency spectrum shown in FIG. 5. The resultant channel 3 and channel 4 RF signals conform to Federal Communication Commission regulations set out in Title 47 of the Code of Federal Regulations for TV signal generating apparatus such as the video disc player.

The FIG. 6 video disc player comprises a turntable-stylus arrangement 10 for rotatably supporting a disc record and recovering recorded information therefrom. The recovered signal is processed in the signal pickup and processing circuitry 11 to produce a baseband composite video signal on connection 22 and a sound carrier, frequency modulated by recovered audio signal, on connection 21. The composite video and the audio signals must then be impressed on an RF carrier for application to the antenna terminals of a conventional TV receiver. The player shown has the provision for optionally generating one of two RF television signals, i.e., channel 3 or channel 4.

In FIG. 6 the composite baseband video and the sound signals are both applied to the two RF modulator circuits 15 and 16. Modulator 15 receives a channel 3 frequency carrier signal from oscillator circuit 12 and produces a double side band amplitude modulated carrier signal on connection 23. Similarly modulator 16 receives a channel 4 frequency carrier signal from RF oscillator circuit 13 and produces a double sideband amplitude modulated carrier signal on connection 24. Either the channel 3 or the channel 4 modulated carrier signal is produced exclusive of the other channel, selection being dependent upon the position of switch 14 which selectively enables one or the other of the oscillator circuits 12 and 13. In the absence of a carrier signal the respective modulator produces no RF output signal.

The channel 3 modulated carrier is passed through a 56.75 MHz band rejection filter 17 which selectively traps or attenuates the lower sound sideband. The channel 3 signal minus the lower sound sideband is then applied to the bandpass filter 20 via the isolation network 19.

Isolation network 19 makes it possible to apply signal from two independent signal sources to the input connection of filter 20 while preventing the output impedance of one of the independent sources from affecting the transfer function of the other independent signal source. Thus the transfer characteristics of trap 17 may be tuned independently of the output impedance of trap 18 present at the second input connection of the isolation circuit and vice versa.

Bandpass filter 20 has a pass band defined to be coincident with the combination of the channel 3 and channel 4 frequency spectrum. Desirably the bandpass filter has a lower frequency cut off characteristic to produce a channel 3 vestigal sideband signal and an upper frequency cut off characteristic which sharply attenuates all signals above the channel 4 upper sound sideband. If the filter is further defined to attenuate all signal frequencies outside the previously described passband, the channel 3 sound trap 17 may be eliminated.

Due to cost, space and assembly limitations involved in a consumer product the ideal band-pass filter characteristic may not be actually achieved. Thus a filter with a less then ideal bandpass transfer function may be utilized which can be realized with a reasonable number of filter components. The RF output signal from the bandpass filter is available for application to the antenna input terminals of a conventional TV signal. But note, if the out of band attenuation of the less than ideal bandpass filter is insufficient to reduce the carrier second and upper harmonic signals below levels established by regulation, then it may be necessary to interpose a low pass filter between the bandpass filter 20 and the RF output terminal. Such a low pass filter would have a cutoff frequency in the range between 72 and approximately 110 MHz.

The channel 4 double sideband modulated signal at connection 24 similarly has its lower sound sideband trapped in frequency rejection filter 18 and is then applied to the bandpass filter 20 via the isolation network 19.

FIG. 7 is a specific embodiment of the RF output circuitry of a video disc player. This circuit utilizes a National Semiconductor LM1889 TV video modulator integrated circuit 30 to generate the channel 3 and channel 4 RF carriers and to modulate those carriers with baseband video and audio signal from the player signal pickup and processing circuitry. A first passive tuned (tank) circuit 31 is coupled to package connectors 6 and 7 to establish the carrier oscillation frequency (channel 3) of a first RF oscillator. The output signal from the first RF oscillator is internally connected to a first internal RF modulator having first and second modulating signal input terminals at package connectors 12 and 13 and an output terminal at package connector 11. A second tank circuit 32 connected to package connectors 8 and 9 establishes the carrier oscillation frequency (channel 4) of a second independent internal RF oscillator. The output signal from the second RF oscillator is internally connected to a second internal RF modulator. The second modulator has an output terminal at package connection 10 and has its modulating signal input terminals connected in parallel with the input terminals of the first RF modulator at connectors 12 and 13.

Composite baseband video signal is applied at package connector 13 and a frequency modulated sound carrier is applied at package connector 12 via isolation resistor R4. The output signals at package connectors 10 and 11 are double sideband modulated carriers similar to those illustrated in FIG. 1.

Operation of the first or second RF oscillator is selected by application of bias potential to either tank circuit 31 or tank circuit 32 by means of switch 35.

The integrated circuit 30 also contains a sound carrier oscillator. The tuned tank circuit 33 establishes the oscillation frequency of the sound carrier frequency. The sound carrier frequency is generated at package connector pin 15. The sound oscillator tank circuit 33 comprises capacitor C1 and inductor L1. A voltage variable capacitance, i.e., varactor diode 34, is arranged effectively in parallel with capacitor C1 by virtue of the series connection of capacitors C2, C3 and diode 34 between connector pin 15 and reference potential. Audio signal potential is applied to the anode of the varactor diode 34. The capacitance of the varactor diode and thus the capacitance of the tank circuit is modulated in accordance with the audio signal potential. Modulation of the audio tank circuit capacitance modulates the sound carrier tuning frequency thereby producing a frequency modulated sound carrier. This modulated carrier appears at connector pin 15 and is applied via resistor R4 to the RF modulator input terminals at package connector 12. Resistors R1, R2 and R3 provide DC current paths for biasing the varactor diode 34 and applying baseband audio to modulate the sound carrier.

RF signal (channel 4) at connector 11 is coupled via coupling capacitor C4 to the input connection of the frequency rejection filter or sound trap 17'. Sound trap 17' comprising inductor L2, capacitor C6, C7 and resistor R7 is a bridged Tee filter which is tuned to be series antiresonant at 56.75 MHz. Near 0 db attentuation, i.e., the widest part of the rejection band, the rejection band width is approximately 2 MHz. The series attenuation at the trap frequency is greater than 30 db.

RF signal (channel 3) at connector 10 is coupled via coupling capacitor C5 to a similar bridged Tee sound trap filter 18' comprising inductor L3, capacitors C8, C9 and resistor R8. Sound trap 18' is tuned to attenuate RF signals occurring at 62.75 MHz to eliminate the lower sound sideband of channel 3.

RF signal from sound traps 17' and 18' are respectively applied via the isolation network 19' to the input connection 40 of bandpass filter 20'. The 300 Ohm resistors R9 and R10 provide respective conductive paths from the sound traps to the bandpass filter input terminal 40. A third resistor R11 is connected between terminal 40 and reference potential. The resistance of R11 (e.g., 50 Ohms) is significantly smaller than the input impedance to the bandpass filter or that of resistors R9 and R10. Therefore, the effective impedance connected to the output terminals of the respective sound traps is substantially the resistance of R9 (300 Ohms) in series with the resistance of R11 (50 Ohms). The effective impedance connected to the input terminal 40 of the bandpass filter 20' is substantially only the resistance of R11 (50 Ohms). These impedance values are constant. Consequently, tuning the filters by mechanically varying the component values of either of the filters 17', 18' or 20' to establish their respective resonant frequencies will have no effect on the resonant frequency of the other of the filters 17', 18' or 20'. As such the circuit 19' has isolated the three filters for purposes of preventing electrical interaction except for providing a signal path between the two sound traps and the bandpass filter.

The bandpass filter 20' including capacitors C10-C14, and inductors L4 and L5 is a Butterworth type having an amplitude transfer function as depicted in FIG. 3. For the filter component values shown in FIG. 7 the passband includes channel 3 and channel 4, contains less than ±0.5 db of ripple in the amplitude response and has a substantially linear phase response from 60 MHz to 72 MHz. The cut off frequency roll off is about 1 db/MHz.

A low pass filter comprising resistor R12, inductor L5 and capacitor C15 is connected between the bandpass filter 20' and the system RF output terminal 41. The low pass filter has a cut off frequency at approximately 80 MHz and a 20 db/decade roll off to further attenuate the channel 3 and channel 4 second harmonics.

What is claimed is:

1. The combination for selectively generating a modulated radio frequency carrier signal at one of a first and second television channel carrier frequencies comprising:

a source of modulating signal;

first and second oscillator circuits for generating first and second radio frequency carrier signals corresponding to adjacent television channel frequencies;

a first modulator circuit responsive to said first carrier signal and to said modulating signal for producing at an output terminal thereof said first carrier signal modulated in accordance with said modulating signal;

a second modulator circuit responsive to said second carrier signal and to said modulating signal for producing at an output terminal thereof said second carrier signal modulated in accordance with said modulating signal;

first and second band rejection filter circuits having respective input terminals connected respectively to the output terminals of said first and second modulator circuits, and having respective output terminals, said first and second band rejection filters having respective stop bands located at 4.5 MHz below the first and second carrier frequencies respectively;

a bandpass filter having an input and an output terminal from which said modulated signal is available, the pass band of said band pass filter extending substantially from the lower cut off frequency corresponding to the television channel associated with the lower of the first and second carrier frequencies, to the upper cut off frequency corresponding to the television channel associated with the other of said first and second carrier frequencies;

isolation circuitry for coupling the output terminals of each of the first and second band rejection filters to the input terminal of said bandpass filter, said isolation circuitry substantially electrically isolating the first modulated carrier from the second band rejection filter and the second modulated carrier from the first band rejection filter; and means for selectively enabling one and disabling the other of said first and second oscillators.

2. In a video disc player apparatus for recovering recorded signal from a disc record, which signal is processed into a composite video TV signal and an audio signal, the combination for selectively generating a modulated radio frequency carrier signal comprising:

first and second oscillator circuits for generating first and second RF carrier signals corresponding to adjacent television channel frequencies to which a television receiver may be tuned;

means for selectively enabling one of said first and second oscillator circuits to oscillate to the exclusion of the other;

first modulator means responsive to the first carrier signal, the composite video signal and the audio signal, said first modulator means generating at an output terminal thereof said first carrier signal amplitude modulated by said composite video and said audio signals;

second modulator means responsive to the second carrier signal, the composite video signal and the audio signal, said second modulator means generating at an output terminal thereof, said second carrier signal amplitude modulated by said composite video and said audio signals, said first and second amplitude modulated carriers being double sideband signals;

first and second frequency rejection filter circuits having respective input terminals connected to the output terminals of the first and second modulator means respectively, and having respective output terminals, the frequency of rejection of each filter being 4.5 MHz below the carrier frequency applied at its input terminal;

a band pass filter having an output terminal at which the player output signal is available and having an input terminal, said band pass filter having a frequency pass band extending substantially from the lower cut off frequency associated with a TV channel incorporating the lower of the two carrier frequencies to the upper cut off frequency associated with a TV channel incorporating the higher of said two carrier frequencies; and isolation circuitry for coupling the output terminals of the first and second frequency rejection filters to the input terminal of the bandpass filter in such fashion that the rejection filters remain electrically isolated from each other with respect to signals in the first and second carrier frequency range.

3. The combination set forth in claim 1 or 2 wherein the isolation circuitry for coupling the output terminals of the rejection filters to the input terminal of the bandpass filter comprises first, second and third resistors each having a first end connected to the bandpass filter input terminal and having respective second ends connected respectively to the output terminal of the first rejection filter, the output terminal of the second rejection filter and to a point of reference potential.

4. The combination set forth in claim 3 wherein the respective frequency rejection filters each comprises:

first and second capacitors having respective first plates connected respectively to the input and output terminals of said rejection filter and having respective second plates connected to a common circuit node;

a resistor connected between said common node and a point of reference potential; and an inductor connected between the input and output terminals of said rejection filter.

5. The combination set forth in claim 1 or 2 wherein said first carrier frequency is substantially 61.25 MHz, said second carrier frequency is 67.25 MHz, said first rejection filter is substantially tuned to reject 56.75 MHz signals and said second rejection filter is substantially tuned to reject 62.75 MHz signals.

6. The combination set forth in claim 1 or 2 further including a low pass filter having a cut off frequency greater than the upper cut off frequency of the band pass filter but less than the second harmonic of the lower carrier frequency so that the amplitude of said second harmonic is attenuated to at least 30 decibels below the modulated carrier.

* * * * *